United States Patent
Skoglund et al.

(10) Patent No.: US 10,828,877 B2
(45) Date of Patent: Nov. 10, 2020

(54) PATCH LAMINATION DEVICE AND METHOD

(71) Applicant: Assa Abloy AB, Stockholm (SE)

(72) Inventors: John P. Skoglund, Minneapolis, MN (US); Ted M. Hoffman, Eden Prairie, MN (US)

(73) Assignee: ASSA ABLOY AB, Stockholm (SE)

( * ) Notice: Subject to any disclaimer, the term of this patent is extended or adjusted under 35 U.S.C. 154(b) by 306 days.

(21) Appl. No.: 15/065,389

(22) Filed: Mar. 9, 2016

(65) Prior Publication Data
US 2017/0259547 A1 Sep. 14, 2017

(51) Int. Cl.
*B32B 37/00* (2006.01)
*B26F 3/00* (2006.01)
*B32B 37/22* (2006.01)
*B32B 38/18* (2006.01)
*B32B 38/00* (2006.01)
*B32B 41/00* (2006.01)
(Continued)

(52) U.S. Cl.
CPC .......... *B32B 37/0053* (2013.01); *B26F 3/002* (2013.01); *B32B 37/0046* (2013.01); *B32B 37/14* (2013.01); *B32B 37/223* (2013.01); *B32B 38/0004* (2013.01); *B32B 38/1808* (2013.01); *B32B 41/00* (2013.01); *B32B 37/0007* (2013.01); *B32B 38/1825* (2013.01); *B32B 38/1875* (2013.01); *B32B 2038/047* (2013.01); *B32B 2307/75* (2013.01); *B32B 2309/10* (2013.01); *B32B 2425/00* (2013.01); *B32B 2429/00* (2013.01)

(58) Field of Classification Search
CPC .. B32B 37/0053; B32B 37/14; B32B 2425/00
USPC .......................................................... 156/60
See application file for complete search history.

(56) References Cited

U.S. PATENT DOCUMENTS 4,060,441 A * 11/1977 Ohta ........................ B05D 1/28
156/230
5,019,203 A * 5/1991 Singer .................. B32B 37/0053
156/309.9
5,783,024 A 7/1998 Forkert
(Continued)

OTHER PUBLICATIONS

Eggen, Web handling: to 7 Causes of Wrinkles, 2011, p. 1-5. (http://pffc-online.com/web-handling/9810-web-handling-top-7-causes-wrinkles-1010) (Year: 2011).*
(Continued)

*Primary Examiner* — Michael N Orlando
*Assistant Examiner* — Christian Roldan
(74) *Attorney, Agent, or Firm* — Schwegman Lundberg & Woessner, P.A.

(57) ABSTRACT

A patch lamination device includes a laminate feed roller, a laminating roller, and a laminate spreader. The laminate feed roller is configured to feed a patch laminate ribbon along a laminate path. The laminating roller is configured to laminate individual patch laminates of the ribbon to a surface of a card substrate. The laminate spreader is positioned between the laminate feed roller and the laminating roller. The laminate spreader is configured to reduce the formation of trough wrinkles in a patch laminate that is tensioned between the laminate feed roller and the laminating roller during lamination of the patch laminate to a card substrate using the laminating roller.

21 Claims, 10 Drawing Sheets

(51) Int. Cl.
*B32B 37/14* (2006.01)
*B32B 38/04* (2006.01)

(56) References Cited

U.S. PATENT DOCUMENTS

| | | | |
|---|---|---|---|
| 5,807,461 A * | 9/1998 | Hagstrom | B32B 37/0053 |
| | | | 156/361 |
| 6,409,872 B1 * | 6/2002 | Campion | B32B 37/182 |
| | | | 156/264 |
| 2002/0144770 A1 | 10/2002 | Mabit | |
| 2004/0069401 A1 | 4/2004 | Wurdell et al. | |
| 2005/0109450 A1 * | 5/2005 | Skoglund | B32B 38/0004 |
| | | | 156/247 |
| 2015/0053330 A1 * | 2/2015 | Fischer | B31F 1/2831 |
| | | | 156/176 |

OTHER PUBLICATIONS

Smith, R. Duane; Guidelines for Rolls Used in Web Handling; 2012 (Year: 2012).*

Extended European Search Report and preliminary patentability opinion from corresponding European Application No. 17156471.9, dated Jul. 13, 2017.

Anonymous: Web Handling: Top 7 Causes of Wrinkles—Paper, Film & Foil Converter, Oct. 10, 2011, Retrieved from the Internet: URL http://pffc-online.com/web-handling/9810-web-handling-top-7-causes-wrinkles-1010 [retrieved on Jun. 28, 2017].

R. Duane Smith: "Guidelines for Rolls Used in Web Handling", AIMCAL Europe, Sep. 30, 2012, Retrieved from the Internet: URL http://www.aimcal.org/uploads/4/6/6/9/46695933/smith_-_guidelines_for_rolls_used_in_web_handling_-_presentation.pdf [retrieved on Jun. 29, 2017].

* cited by examiner

PATCH LAMINATION DEVICE AND METHOD

FIELD

Embodiments of the invention are directed to a patch lamination device that is configured to laminate patch laminates to a surface of a substrate. Additional embodiments are directed to a patch lamination method.

BACKGROUND

Credentials include identification cards, driver's licenses, passports, and other documents. Such credentials are formed from credential or card substrates including paper substrates, plastic substrates, cards, and other materials. Such credentials generally include printed information, such as a photo, account numbers, identification numbers, and other personal information. Credentials can also include data that is encoded in a smartcard chip, a magnetic stripe, or a barcode, for example.

Credential production devices include processing devices that process credential substrates by performing at least one processing step in forming a final credential product. Such processes generally include a printing process, a laminating or transfer process, a data reading process, a data writing process, and/or other process used to form the desired credential.

In a printing process, a printing device is used to print an image either directly to the substrate (i.e., direct printing process) or to a print intermediate, from which the image is transferred to the substrate (i.e., reverse-image transfer printing process). Typical printing devices include a thermal print head, which prints an image by heating and transferring dye from a print ribbon, and an ink jet print head.

In a transfer or laminating process, an overlaminate material is transferred to a surface of the substrate using a transfer device, such as a heated laminating or transfer roller. The overlaminate material generally provides protection to the surface of the substrate, such as protection from abrasion, moisture, etc. The overlaminate material may be used as a print intermediate, to which an image is printed before the material is laminated to the substrate.

The overlaminate material is typically one of two types: a thin film laminate or a patch laminate. Thin film laminates are fracturable laminates that are generally formed of a continuous resinous material that have been coated onto a carrier layer or backing to form a transfer ribbon. The laminating roller is used to activate a thermal adhesive on the thin film laminate and bond the material to a surface of a substrate. The carrier layer or backing is then removed to complete the lamination or transfer process.

Patch laminates are pre-cut polyester film patches that have been coated with a thermal adhesive on one side. The patch laminates may be in the form of a patch laminate ribbon, in which the patch laminates are each removably adhered to a carrier layer, or the patch laminates are joined to each other in series without a supporting carrier layer. During a lamination operation, the laminating roller is used to heat an individual patch to activate the thermal adhesive, and press the adhesive-coated side of the patch to a surface of a substrate to bond the patch to the surface. When the patch laminates are carried on a carrier layer, the carrier layer is removed from the bonded patch laminate to complete the lamination process. When the patch laminates are joined in series to each other, the bonded patch laminate must be detached from the adjoining patch laminate to complete the lamination process. This may require the bonded patch to be cut from the adjoining patch laminate, or torn from the adjoining patch laminate along a perforated line that separates the bonded patch laminate from the adjoining patch.

SUMMARY

Embodiments of the invention are directed to a patch lamination device that is configured to laminate patch laminates to a surface of a substrate. Additional embodiments are directed to a patch lamination method.

Some embodiments of the patch lamination device include a laminate feed roller, a laminating roller and a laminate spreader. The laminate feed roller is configured to feed a patch laminate ribbon along a laminate path. The laminating roller is configured to laminate individual patch laminates of the ribbon to a surface of a card substrate. The laminate spreader is positioned between the laminate feed roller and the laminating roller. The laminate spreader is configured to reduce the formation of trough wrinkles in a patch laminate that is tensioned between the laminate feed roller and the laminating roller during lamination of the patch laminate to a card substrate using the laminating roller.

In some embodiments of the method of laminating a patch laminate of a patch laminate ribbon to a card substrate, the patch laminate ribbon is fed along a laminate path using a laminate feed roller. A first portion of a leading patch laminate of the ribbon is laminated to a surface of a card substrate using a laminating roller, including feeding the card substrate and the first portion along a card path. The leading patch laminate is tensioned between the laminate feed roller and the laminating roller including stopping the feeding of the ribbon using the laminate feed roller while feeding the card substrate and the first portion of the leading patch laminate along the card path. A second portion of the leading patch laminate is then laminated to the surface during the tensioning of the leading patch laminate. The formation of trough wrinkles in the leading patch laminate is reduced during the tensioning of the leading patch laminate using a laminate spreader that is positioned between the laminate feed roller and the laminating roller. The leading patch laminate is then detached from the ribbon in response to the tensioning of the leading patch laminate. A third portion of the leading patch laminate is then laminated to the surface of the card substrate using the laminating roller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
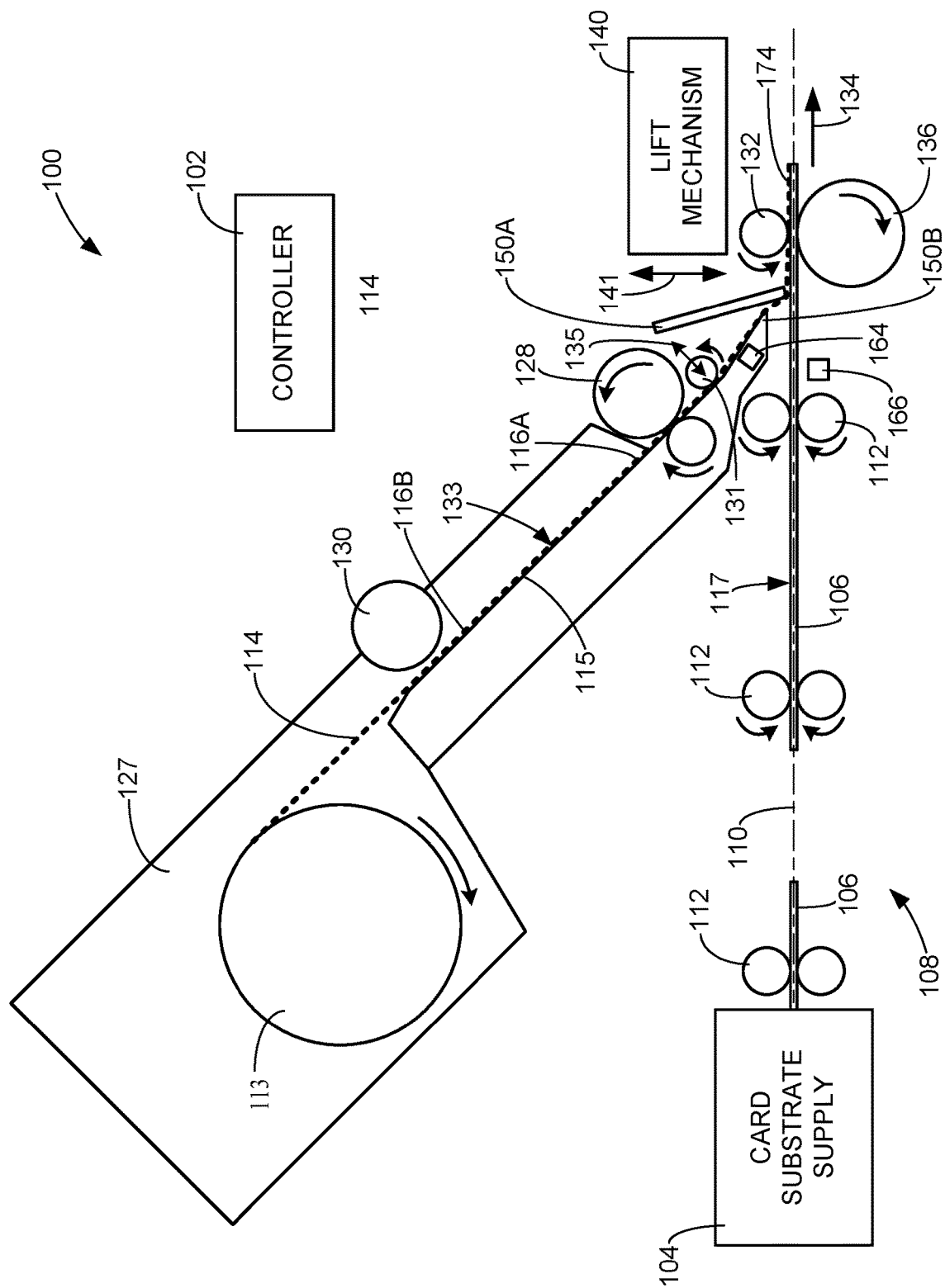
FIG. 1 is a simplified side view of a patch lamination device in accordance with embodiments of the invention. Embodiments of the device are configured to apply patch laminates to substrates.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, devices, and/or computer program products, for example. Accordingly, the present invention may take the form of an entirely hardware embodiment, an entirely software embodiment or an embodiment combining software and hardware aspects. The computer program or software aspect of the present invention may comprise computer readable instructions or code stored in a computer readable medium or memory. Execution of the program instructions by one or more processors (e.g., central processing unit) results in the one or more processors performing one or more functions or method steps described herein. Any suitable patent subject matter eligible computer readable media or memory may be utilized including, for example, hard disks, CD-ROMs, optical storage devices, or magnetic storage devices. Such computer readable media or memory does not include transitory waves or signals.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

FIG. 1 is a simplified side view of a patch lamination device 100 in accordance with embodiments of the invention. Embodiments of the device 100 are configured to apply patch laminates to card substrates. In some embodiments, the patch lamination device 100 forms a portion of a credential production device that is used to perform at least one process to form a credential product. Thus, the patch lamination device 100 may be a component in a larger device that may comprise a print unit that is configured to print an image to the substrates or the patch laminates, a data reading or encoding device configured to read data from or encode to the substrates (e.g., a magnetic stripe or memory circuit of the substrates), and/or other conventional card substrate processing component.

In some embodiments, the device 100 includes a controller 102 that represents one or more processors that are configured to execute program instructions, stored in memory of the device, such as memory of the controller 102 or other location. The execution of the instructions by the controller 102 controls components of the patch lamination device 100 to perform functions and method steps described herein, such as a patch lamination process, for example.

In some embodiments, the device 100 includes a card substrate supply 104 configured to support one or more card substrates 106 for processing by the device 100. The card substrates 106 may take on many different forms. In some embodiments, the card substrates 106 are in the form of rigid or semi-rigid card substrates, which may include plastic substrates, or paper substrates other than traditional paper sheets used in copiers or paper sheet printers. In some embodiments, the substrates 106 are credential substrates, which are substrates that are used to form credentials, such as identification cards, membership cards, proximity cards, driver's licenses, passports, credit and debit cards, and other credentials or similar products.

In some embodiments, the patch lamination device 100 includes a card transport mechanism 108 that is configured to feed individual card substrates 106 from the supply 104 along a card path 110, as indicated in FIG. 1. In some embodiments, the card transport mechanism 108 includes one or more feed rollers 112 or other conventional card feeding components. In some embodiments, the feed rollers 112 are in the form of pinch roller pairs, as shown in FIG. 1. In some embodiments, the card substrates 106 are fed along the card path 110 in a portrait orientation, in which a short edge of the substrate 106 leads. Alternatively, the card substrates 106 may be fed along the card path 110 in a landscape orientation, in which a long edge of the substrate 106 leads.

Figure 2:
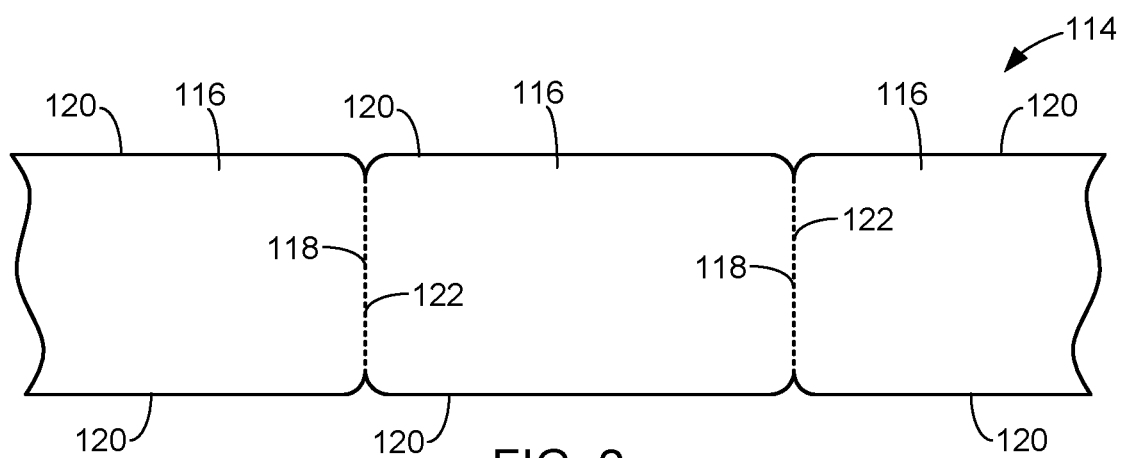
FIGS. 2 and 3 are simplified top views of exemplary patch laminate ribbons in accordance with embodiments of the invention.
Figure 3:
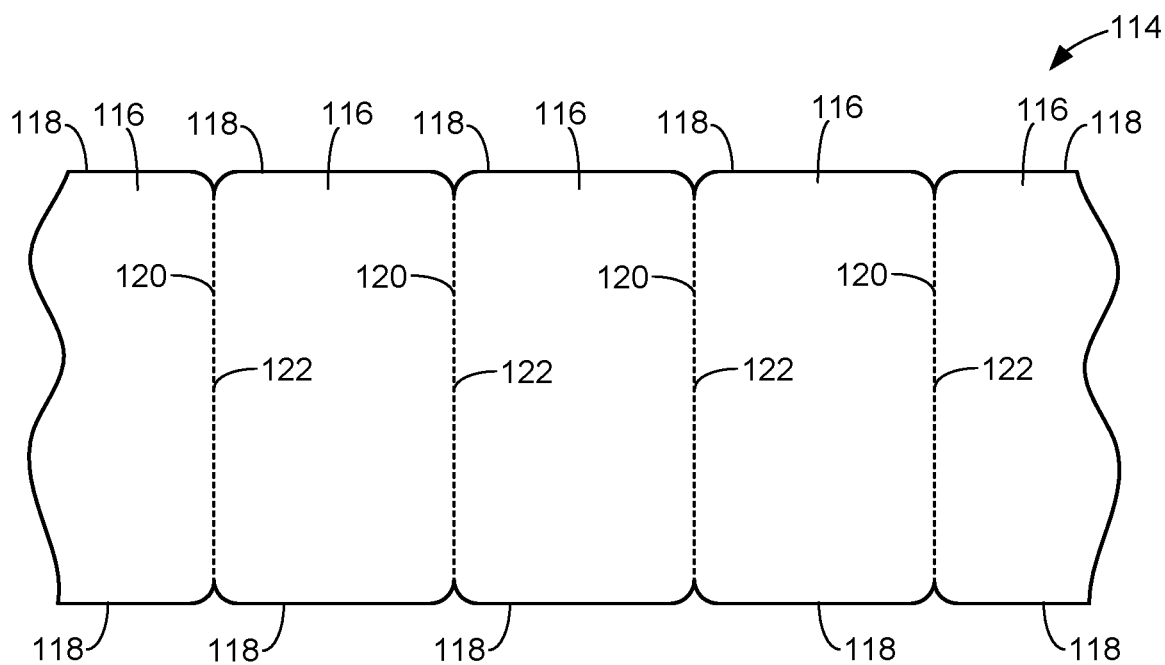

In some embodiments, the patch lamination device 100 includes a patch laminate ribbon 114, which is illustrated in dashed lines in FIG. 1. The patch laminate ribbon 114 may be supported, for example, on a supply spool 113. FIGS. 2 and 3 are simplified top views of exemplary patch laminate ribbons 114 in accordance with embodiments of the invention. In some embodiments, the patch laminate ribbon 114 comprises a plurality of individual patch laminates, each generally designated as 116, that are joined together in series. In some embodiments, each of the patch laminates 116 is sized to conform to a surface 117 of the card substrate 106. For example, in some embodiments, the patch laminates 116 each include opposing short edges 118, and opposing long edges 120 that respectively correspond and to the short and long edges of the card substrate 106.

In some embodiments, the patch laminates 116 are oriented in a portrait orientation, in which the short edges 118 of the patches are linked together, as shown in FIG. 2. This configuration is used when the card substrates 106 are fed along the card path 110 in the portrait orientation. In some embodiments, the patch laminates 116 are oriented in a landscape orientation, in which the long edges 120 of the patches are linked together, as shown in FIG. 3. This configuration is used when the card substrates 106 are fed along the card path 110 in the landscape orientation.

In some embodiments, the junction between the adjoining patches comprises a perforated line 122 in the material forming the patch laminate 116, which has a reduced strength relative to other portions of the ribbon 114. As discussed below in greater detail, a leading patch laminate 116A in the ribbon 114 may be detached from the adjoining patch laminate 116 along the perforated line 122 by applying a tension across the perforated line 122 that exceeds a detachment threshold tension.

Figure 4:
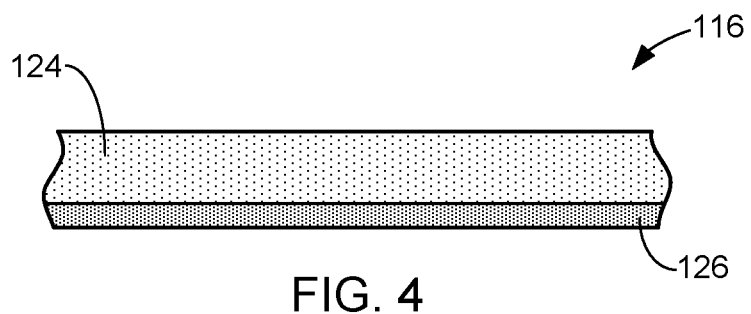
FIG. 4 is a simplified cross-sectional view of an exemplary patch laminate in accordance with embodiments of the invention.

In some embodiments, the patch laminates 116 each comprise a layer of protective material 124 and an adhesive layer 126, as shown in FIG. 4, which is a simplified cross-sectional view of an exemplary patch laminate 116, in accordance with embodiments of the invention. Embodiments of the protective material 124 include conventional overlaminate materials, such as polyester, vinyl, or other conventional overlaminate material. In some embodiments, the adhesive layer 126 comprises a conventional thermal adhesive that is bonded to the protective material. In some embodiments, the adhesive layer 126 is configured to receive a printed image, such as during a reverse-image printing process.

In some embodiments, the patch lamination device 100 includes a laminate feed mechanism 127, or other suitable component, that is configured to feed the patch laminate ribbon 114 along a laminate path 115 through the device 100. In some embodiments, the laminate feed mechanism includes one or more laminate feed rollers 128, such as a motorized pinch roller, as shown in FIG. 1. In some embodiments, the device 100 includes a manual feed roller 130 that can be used to manually feed the ribbon 114 along the laminate path 115 to facilitate installation of the ribbon 114 in the device 100, for example. In some embodiments, the device includes a guide roller 131 that assists in maintaining the patch laminate ribbon 114 on the desired laminate path 115. In some embodiments, the laminate path 115 through the feed mechanism 127 is defined by a surface 133, that supports the ribbon 114 as it is fed through the feed mechanism 127. In some embodiments, the guide roller 131 is configured to move relative to the surface 133, as indicated by arrow 135. In some embodiments, the ends of guide roller 131 are supported in slots that allow the guide roller 131 to move away from and toward the surface 133 (i.e., "float") in response to the feeding of the ribbon 114 beneath the roller 131. In some embodiments, the weight of the roller 131 biases the roller 131 toward the surface 133. In some embodiments, a biasing mechanism, such as a spring, may be used to bias the roller 131 toward the surface 133.

In some embodiments, the patch lamination device 100 includes a laminating roller 132, or other suitable lamination device that is configured to perform a lamination operation on individual card substrates 106 presented to the laminating roller 132 along the card path 110, during which a leading patch laminate 116A of the ribbon 114 is bonded to the surface 117 of the substrate 106, as indicated in FIG. 1. In some embodiments, as the card substrate 106 is fed in a feed direction 134 along the card path 110, the laminating roller 132 heats the patch laminate 116 to activate the adhesive layer 126 while pressing the adhesive layer side of the patch laminate 116 against the surface 117 of the card substrate 106, which is supported by a platen roller 136 or other suitable support. This bonds the patch laminate 116 to the surface 117 of the substrate 106.

In some embodiments, the device includes a lift mechanism 140 that is configured to raise the laminating roller 132 relative to the card path 110 between raised and operating positions, as indicated by arrow 141 in FIG. 1. In some embodiments, the lift mechanism 140 moves the laminating roller 132 to the raised position, as the leading patch laminate 116A and the card substrate 106 are moved into position for the lamination process, and moves the laminating roller 132 to the operating position (FIG. 1) to nip the card substrate 106 and patch laminate 116 against the platen roller 136 and perform the lamination operation.

During this lamination process, the leading patch laminate 116A is detached from the adjoining patch laminate 116 along the perforated line 122 between the leading patch laminate 116A and the adjoining patch laminate 116, to separate the leading patch laminate 116A from the patch laminate ribbon 114. The card substrate 106 with the laminated patch 116A can then be discharged from the device 100, or passed to other components of a credential production device for further processing.

In some embodiments, the leading patch laminate 116A is detached from the adjoining patch laminate 116B along the perforated line 122 during the lamination process by increasing the tension across the perforated line 122 of the ribbon 114 to the detachment threshold, at which the ribbon 114 will tear along the perforated line 122. As discussed below in greater detail, in some embodiments, the leading patch laminate 116A is tensioned by stopping the rotation of the laminate feed roller 128 as the laminating roller 132 performs the lamination operation on the substrate 106 and the leading patch laminate 116A. Thus, as the laminating roller 132 rotates to drive the substrate 106 and leading patch laminate 116A along the card path 110 in the feed direction 134, the laminate feed roller 128 prevents movement of the patch laminate ribbon 114 along the laminate path 115. This generates tension across the perforated line 122 border between the leading patch laminate 116A and the adjoining patch laminate 116B. When the tension reaches the detachment threshold, the leading patch laminate 116A tears away from the adjoining patch laminate 116 along the perforated line 122. In some embodiments, the laminating roller 132 then completes the lamination of the trailing portion of the leading patch laminate 116A to the substrate 106.

Figure 5:
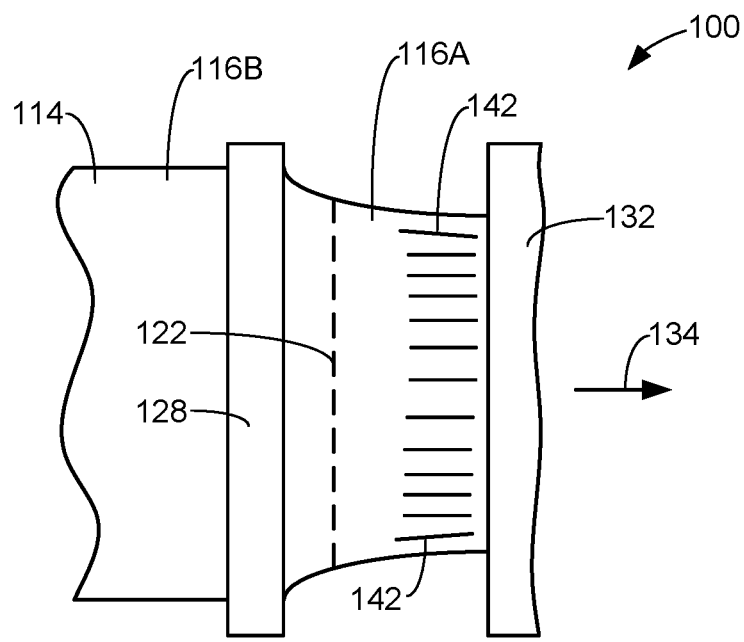
FIGS. 5 and 6 are simplified top views of a portion of the patch lamination device of FIG. 1 during a lamination process, in which a leading patch laminate is tensioned near a detachment threshold between a laminate feed roller and a laminating roller.

During the detachment phase of the lamination operation, the patch laminate 116A stretches along the feed direction 134 and contracts along a line that is transverse to the feed direction 134, as illustrated in the simplified top view of a portion of the device 100 shown in FIG. 5, in which some of the components of the device 100 are not shown in order to simplify the drawing. This contraction of the patch laminate 116A results in the formation of trough wrinkles or furrows in the patch laminate 116A, which are illustrated schematically by lines 142 in FIG. 5. The formation of such trough wrinkles during the lamination of the patch laminate 116A to the substrate 106 can result in a defective lamination of the patch laminate 116A to the substrate 106, such as when the wrinkled portion of the leading patch laminate 116A is bonded to the surface 117 of the substrate 106.

Embodiments of the patch lamination device 100 include at least one laminate spreader, generally referred to as 150, that is positioned between the laminate feed roller 128 and the laminating roller 132, and is configured to eliminate or at least reduce the occurrence of trough wrinkles in the leading patch laminate 116A during lamination operations. In some embodiments, the device 100 includes a laminate spreader 150A and/or a laminate spreader 150B, as shown in FIG. 1.

Figure 6:
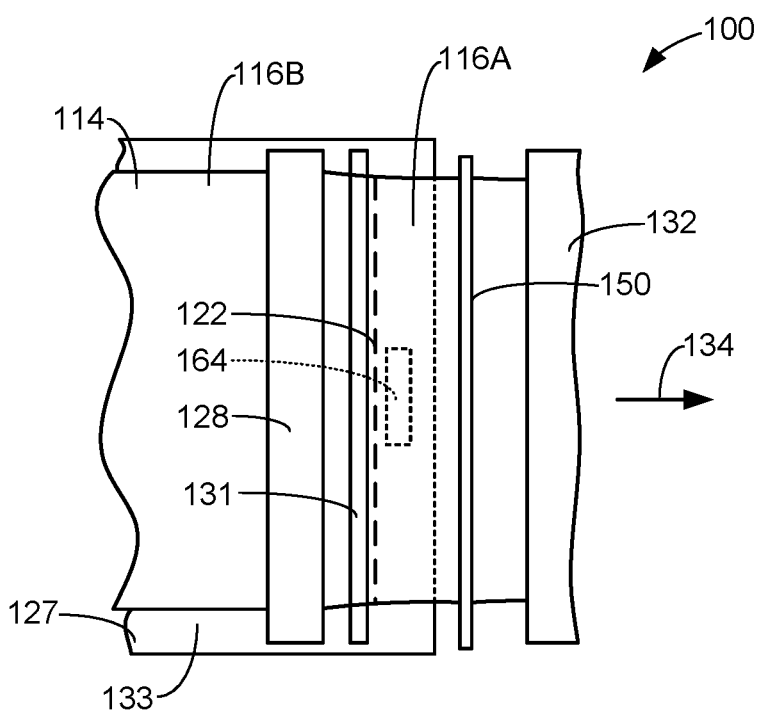

FIG. 6 is a simplified top view of a portion of the device 100 during a lamination process, in which a leading patch laminate 116A is tensioned near the detachment threshold between the laminate feed roller 128 and the laminating roller 132. Some of the components of the device 100 are not shown in FIG. 6 in order to simplify the drawing. In some embodiments, the laminate spreader 150 operates to reduce the contraction of the leading patch laminate 116A in the direction that is transverse to the feed direction 134 of the leading patch laminate 116A and the substrate 106 to reduce the formation of trough wrinkles in the leading patch laminate 116A at the laminating roller 132. Additionally, the guide roller 131 presses the patch laminate 116A or 116B against the surface 133, which also reduces the formation of trough wrinkles in the leading patch laminate 116A at the laminating roller 132. This reduces or eliminates the defective lamination that would likely occur without the laminate spreader 150.

Figure 7:
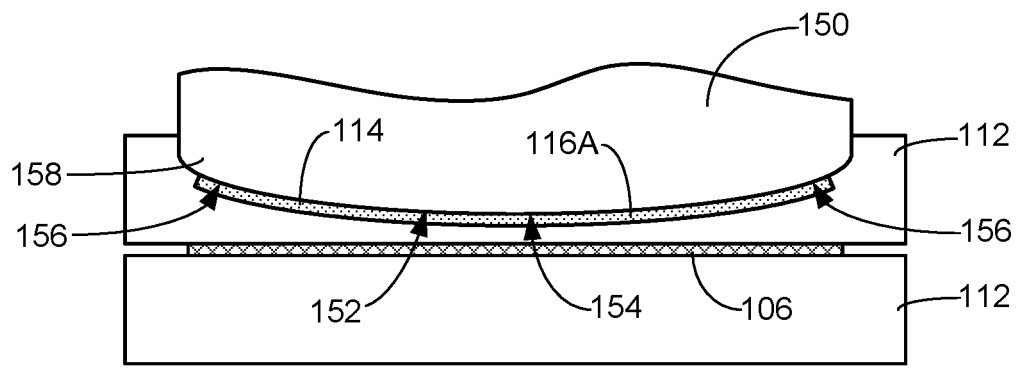
FIGS. 7 and 8 are simplified front cross-sectional views of exemplary laminate spreaders, in accordance with embodiments of the invention.
Figure 8:
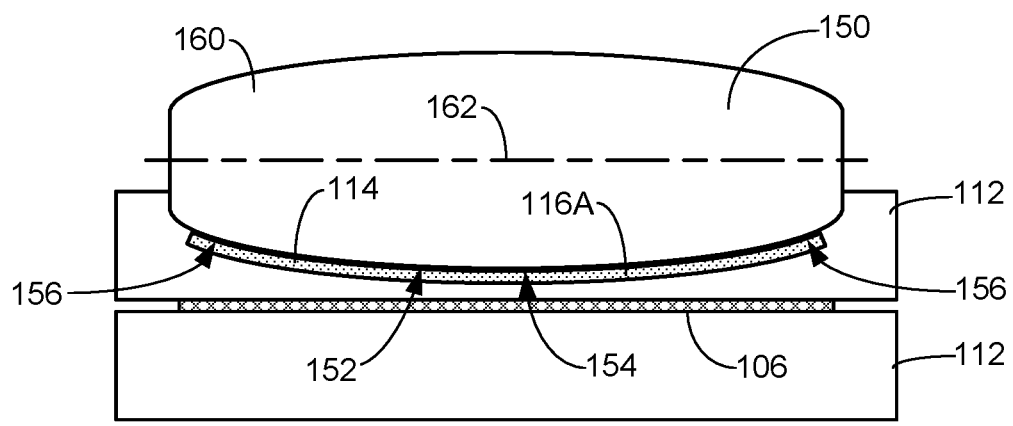
Figure 9:
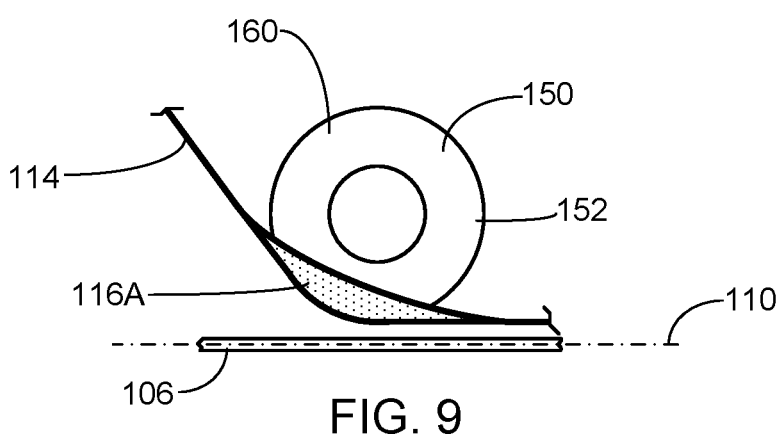
FIG. 9 is a simplified side view of the exemplary laminate spreader of FIG. 8 in accordance with embodiments of the invention.
Figure 10:
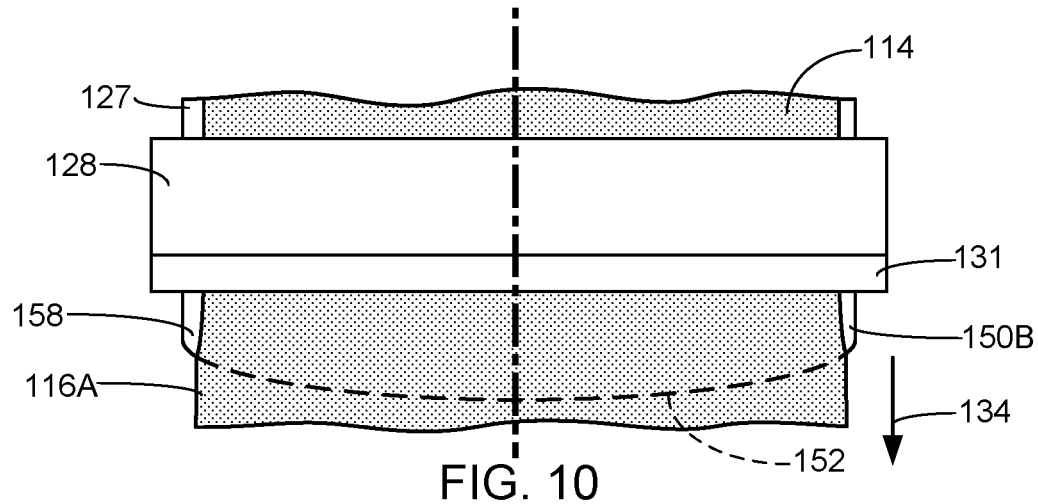
FIG. 10 is a simplified top view of an exemplary laminate spreader, in accordance with embodiments of the invention.

Exemplary embodiments of the at least one laminate spreader 150 will be described with reference to FIGS. 7-10. FIGS. 7 and 8 are simplified front cross-sectional views of exemplary laminate spreaders 150 operating as laminate spreader 150A (FIG. 1) and engaging a leading laminate patch 116 with a card substrate 106 being fed along the card path 110 by feed rollers 112, in accordance with embodiments of the invention. FIG. 9 is a side view of the exemplary laminate spreader 150 of FIG. 8, in accordance with embodiments of the invention. FIG. 10 is a top view of an exemplary laminate spreader 150B, in accordance with embodiments of the invention.

In some embodiments, each of the laminate spreaders 150 extends across a width of the leading patch laminate 116A, which is transverse to the feed direction 134 (FIG. 1), as shown in FIGS. 7, 8 and 10. In some embodiments, the laminate spreader 150 includes at least one patch engaging surface 152 that engages the leading patch laminate 116A as it is tensioned between the laminate feed roller 128 and the laminating roller 132 during the detachment phase of the lamination operation.

In some embodiments, the patch engaging surface 152 is concave, as shown in FIGS. 7, 8 and 10. As the leading patch is tensioned between the laminate feed roller 128 and the laminating roller 132, the leading patch laminate 116A is pressed against the patch engaging surface 152 and is forced to conform to the patch engaging surface 152. The concave patch engaging surface 152 generally operates to restrict the contraction of the leading patch laminate 116A that is being tensioned during the patch detachment phase of the lamination operation, and reduce or prevent the formation of trough wrinkles 142 (FIG. 5) in the leading patch laminate 116A, as shown in FIG. 6.

In some embodiments, the patch engaging surface 152 includes a central patch engaging surface 154 that is located between end patch engaging surfaces 156. In some embodiments, the central patch engaging surface 154 extends closer to the card path 110 or the card substrate 106 than the end patch engaging surfaces 156, as shown in FIGS. 7 and 8.

In some embodiments, the laminate spreader 150A (FIGS. 1 and 7) and the laminate spreader 150B (FIGS. 1 and 10) are the form of a deflector member 158. In accordance with these embodiments, the patch engaging surface 152 of the deflector member 158 has a substantially fixed position relative to the laminate path 115 during the lamination process. The deflector member 158 can be formed of rigid or flexible material, such as plastic, rubber, metal, or other suitable material.

In some embodiments, the laminate spreader 150 comprises a deflector roller 160 having the patch engaging surface 152, as shown in FIGS. 8 and 9. In some embodiments, the deflector roller 160 is configured to rotate about an axis 162 that is perpendicular to the direction in which the leading patch laminate 116A is fed along the laminate path 115. In some embodiments, the roller 160 rotates in response to movement of the leading patch laminate 116A along the laminate path 115, such that the rolling patch engaging surface 152 does not slide relative to the leading patch laminate 116A.

In some embodiments, the device 100 includes multiple laminate spreaders 150 formed in accordance with one or more embodiments described herein. For instance, the exemplary patch lamination device 100 may include the laminate spreaders 150A and 150B, as shown in FIG. 1. In some embodiments, one or both of these laminate spreaders 150 is replaced with the laminate spreader 150 of FIGS. 8 and 9. In some embodiments the multiple laminate spreaders 150 are displaced from each other along the laminate path 115, and each of the laminate spreaders 150 resists and reduces the contraction of the leading patch laminate 116A while the patch laminate 116A is tensioned during the detachment phase of the lamination operation. Such additional laminate spreaders 150 may be necessary depending on the distance between the laminate feed roller 128 and the laminating roller 132, and the detachment threshold tension.

In some embodiments, the lift mechanism 140 is configured to raise and lower at least one of the laminate spreaders 150, such as the laminate spreader 150A, relative to the card path 110. In some embodiments, the laminate spreader 150 has a fixed position relative to the laminating roller 132. That is, in some embodiments, the laminate spreader 150 is attached to a frame that supports the laminating roller 132 and is moved by the lift mechanism 140 along with the laminating roller 132 between the raised and operating positions.

Figure 11:
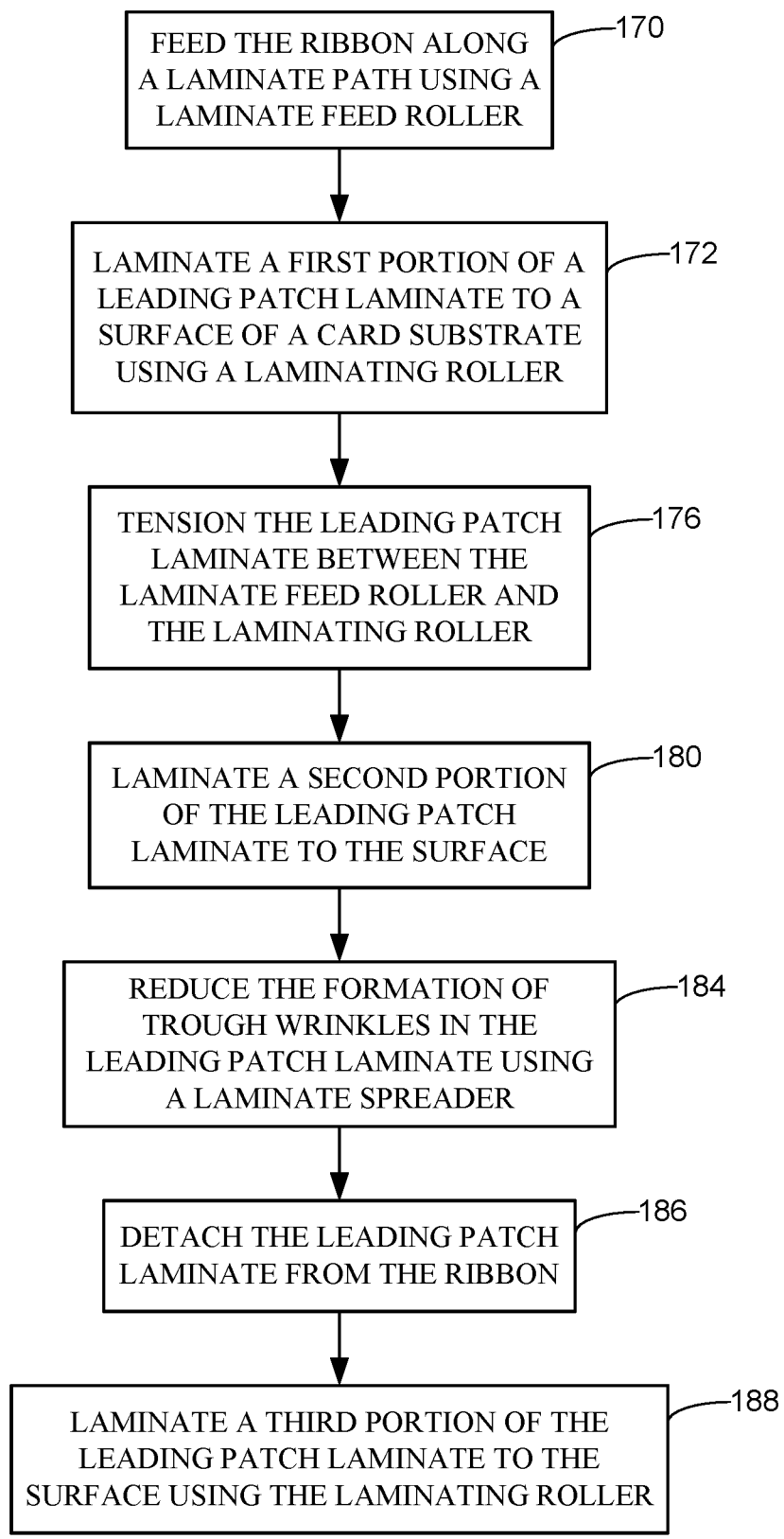
FIG. 11 is a flowchart illustrating an exemplary method of laminating a patch laminate to a card substrate, in accordance with embodiments of the invention.

Some embodiments are directed to a method of laminating a patch laminate 116 to a card substrate 106. FIG. 11 is a flowchart illustrating an exemplary method of laminating a patch laminate 116 to a card substrate 106, in accordance with embodiments of the invention. Steps of the method will be described with reference to FIGS. 12-17, which are simplified side views of a portion of the laminating device 100 of FIG. 1 during different stages of the method, in accordance with embodiments of the invention.

Figure 12:
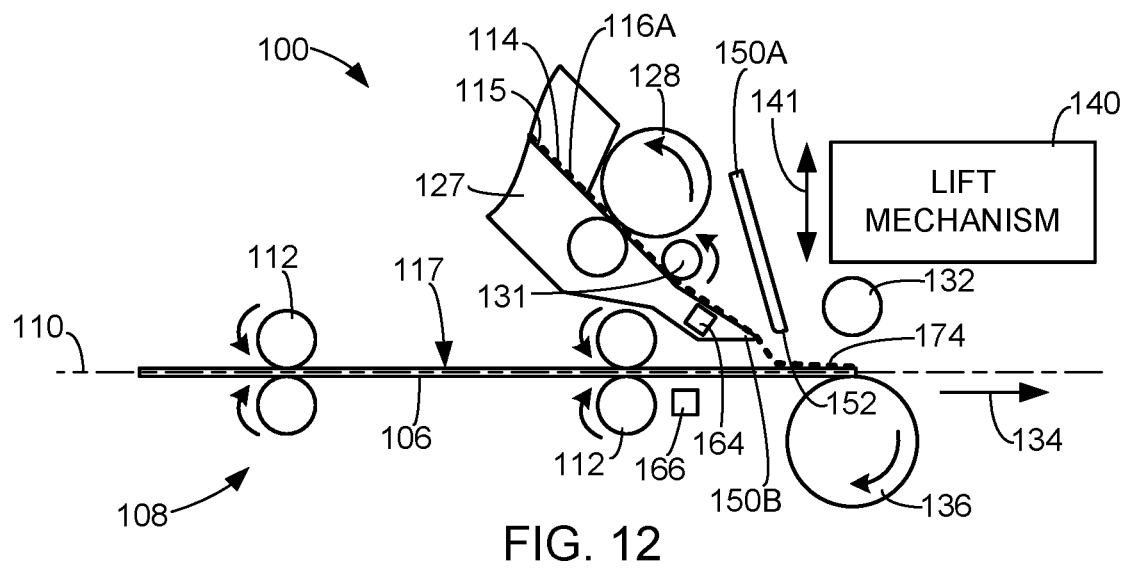
FIGS. 12-17 are simplified side views of a portion of the laminating device of FIG. 1 during different stages of a lamination method, in accordance with embodiments of the invention.

In some embodiments of the method, the controller 102 initially aligns the leading patch laminate 116A and the substrate 106 for the lamination process. In some embodiments, the laminating roller 132 is moved to the raised position using the lift mechanism 140 during this alignment step, as shown in FIG. 12. In some embodiments, at least one of the laminate spreaders 150 is raised relative to the card path 110 along with the laminating roller 132 using the lift mechanism 140 during the alignment step, as also shown in FIG. 12.

In some embodiments, an individual card substrate 106 is fed from the card substrate supply 104 along the card path 110 using the card transport mechanism 108. Additionally, the patch laminate ribbon 114 is fed along the laminate path 115 using the laminate feed roller 128.

In some embodiments, the controller 102 controls the position of the leading patch laminate 116A along the laminate path 115 relative to the card substrate 106 by detecting a leading edge of the leading patch laminate 116A, which indicates the position of the leading patch laminate 116A along the path 115, using a patch sensor 164 (FIG. 1), which may include an optical sensor, such as a reflective sensor, for example. In some embodiments, the sensor 164 is configured to detect a registration mark on the ribbon 114, such as, for example, the perforated line 122 separating the leading patch laminate 116A from the adjoining patch laminate 116, a printed mark on the ribbon 114, or other suitable registration mark.

Similarly, in some embodiments, the controller 102 controls the position of the substrate 106 along the card path 110 relative to the leading patch laminate 116A using a card sensor 166 (FIG. 1), which may include an optical sensor, for example. After establishing the relative positions of the leading patch laminate 116A and the card substrate 106, the controller 102 aligns or registers the leading patch laminate 116A with the substrate 106. In some embodiments, the leading patch laminate 116A is fed along the laminate path 115 using the laminate feed roller 128, and the card substrate 106 is fed along the card path 110 using the card transport mechanism 108 to position them in proper alignment for lamination, as shown in FIG. 12.

Figure 13:
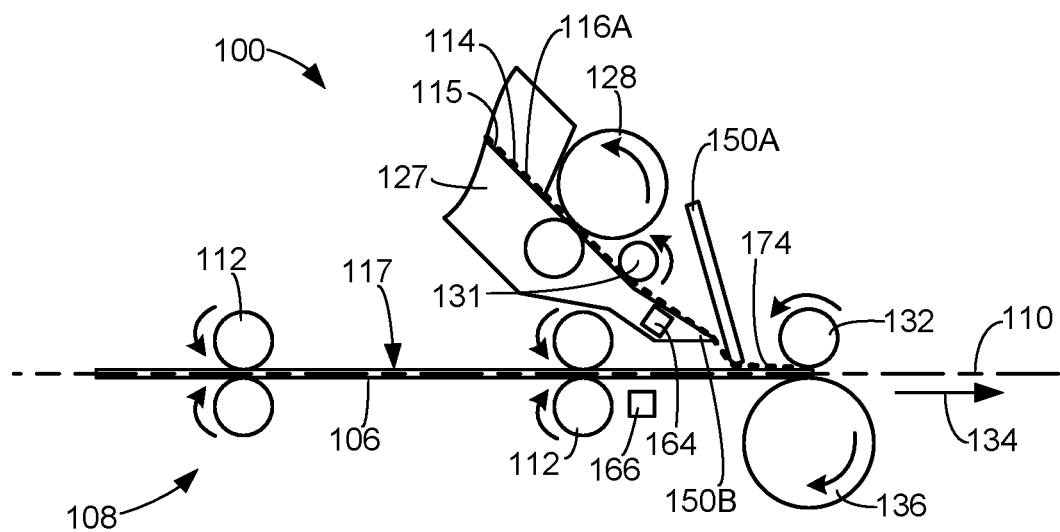

With the card substrate 106 aligned to the leading patch laminate 116A and positioned at a desired location along the card path 110 relative to the laminating roller 132 for commencement of a lamination operation, the laminating roller 132 and/or the laminate spreader are lowered from the raised position to the operating position using the lift mechanism 142, and the leading patch laminate 116A and card substrate 106 are pinched between the laminating roller 132 and the platen roller 136, as shown in FIG. 13.

At 170 of the method, the patch laminate ribbon 114 is fed along the laminate path 115 using the laminate feed roller 128, as indicated in FIG. 13. In some embodiments, the card substrate 106 is fed along the card path 110 using the card transport mechanism 108, such as using the feed rollers 112. In some embodiments, this feeding of the leading patch laminate 116A and the card substrate 106 results in the leading patch laminate 116A and the card substrate 106 being fed at substantially the same speed in the feed direction 134 along the card path 110 at the laminating roller 132. As a result, while the leading patch laminate 116A may be under tension during this feeding phase, the tension in the leading patch laminate 116A is less than the detachment threshold required to tear the leading patch laminate 116A along the perforated line 122 from the adjoining patch laminate 116.

At 172 of the method, a first portion 174 of the leading patch laminate 116A is laminated to the surface 117 of the card substrate 106 using the laminating roller 132, as shown in FIG. 1. During this lamination phase, the laminating roller 132 heats the first portion 174 of the patch laminate 116 to activate the thermal adhesive layer 126, and presses the adhesive layer side of the patch laminate 116 against the surface 117 of the card substrate 106 supported by the platen roller 136 to bond the first portion of the leading patch laminate 116A to the surface 117.

Figure 14:
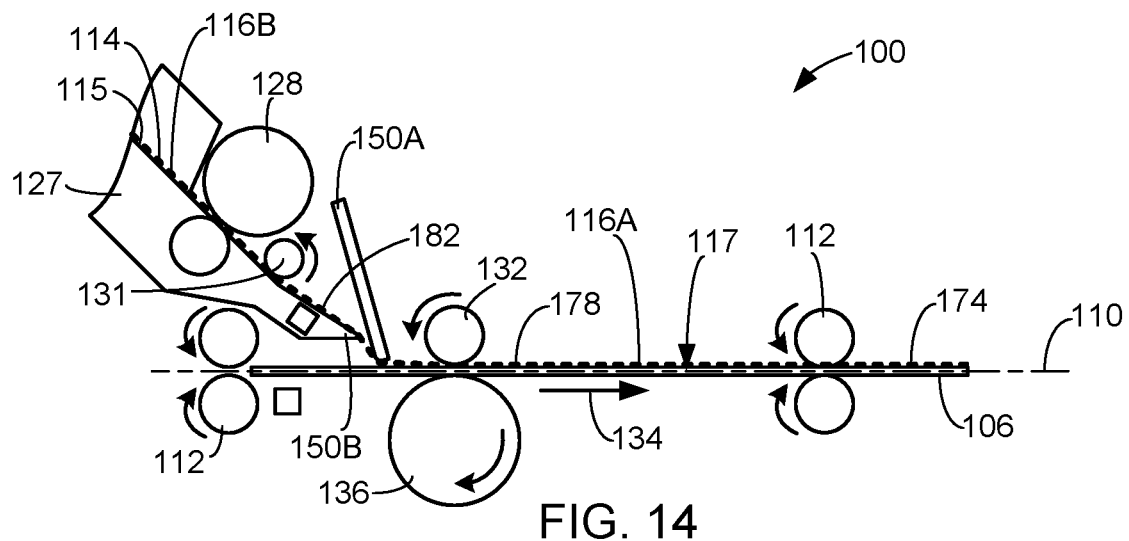

At 176 of the method, the leading patch laminate 116A is tensioned between the laminate feed roller 128 and the laminating roller 132. In some embodiments, step 176 involves stopping the rotation of the laminate feed roller 128, while the laminating roller 132 and/or the feed rollers 112 of the card transport mechanism 108 continue to drive the card substrate 106 and at least the first portion 174 of the leading patch laminate 116A that has bonded to the surface 117 of the card substrate 106 along the card path 110 in the feed direction 134, as indicated in FIG. 14. In some embodiments, step 176 is triggered when the perforated line 122 is positioned between the laminate feed roller 128 and the laminating roller 132, as shown in FIG. 6, such as downstream of the guide roller 131 (FIG. 1) relative to the direction in which the ribbon 114 is fed along the laminate path 115, for example. During step 176, a second portion 178 of the leading patch laminate 116A is laminated to the surface 117 of the card substrate 106 using the laminating roller 132, as the leading patch laminate 116A is tensioned between the laminate feed roller 128 and the laminating roller 132, as indicated at step 180.

During steps 176 and 180, tension in a third portion 182 of the leading patch laminate 116A extending between the laminate feed roller 128 and the laminating roller 132 increases. At 184, the formation of trough wrinkles in the third portion 182 of the leading patch laminate 116A is reduced during steps 176 and 180 using at least one laminate spreader 150 due to the tensioning of the third portion 182 of the leading patch laminate 116A against the patch engaging surface 152 of each of the one or more laminate spreaders 150, such as shown in FIGS. 6 and 14. This inhibits the contraction of the leading patch laminate 116A in the widthwise direction and the formation of trough wrinkles in the leading patch laminate 116A, as discussed above.

Figure 15:
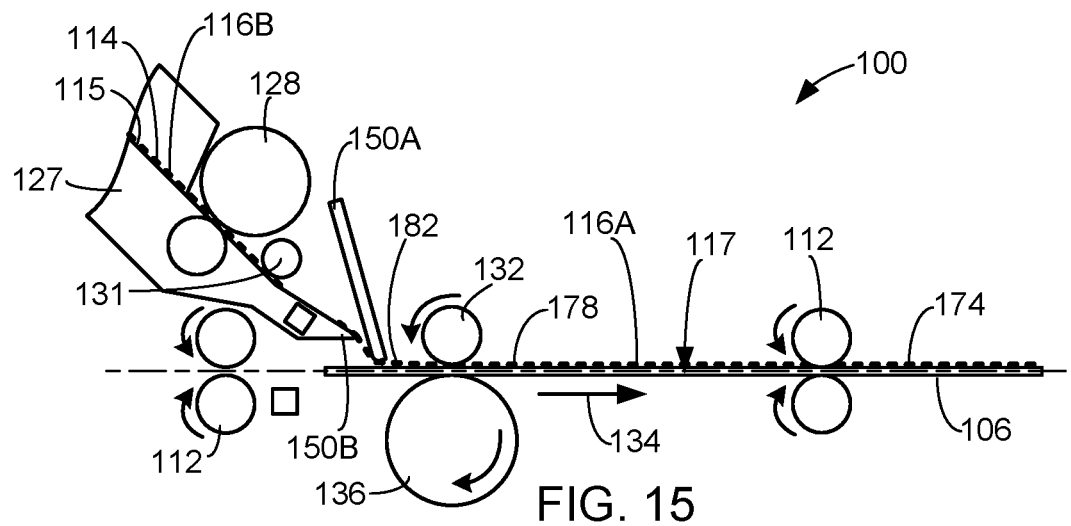

As the card substrate 106 and the first and second portions 174, 178 of the leading patch laminate 116A that are bonded to the surface 117 of the card substrate 106 are fed along the card path 110 while the laminate feed roller 128 prevents the patch laminate ribbon 114 from being fed further along the laminate path 115, tension in the third portion 182 of the leading patch laminate 116A between the laminate feed roller 128 and the laminating roller 132 increases until it reaches the detachment threshold. At step 186, the leading patch laminate 116A detaches from the patch laminate ribbon 114 along the perforated line 122 between the leading patch laminate 116A and the adjoining patch laminate 116B, as indicated in FIG. 15.

Figure 16:
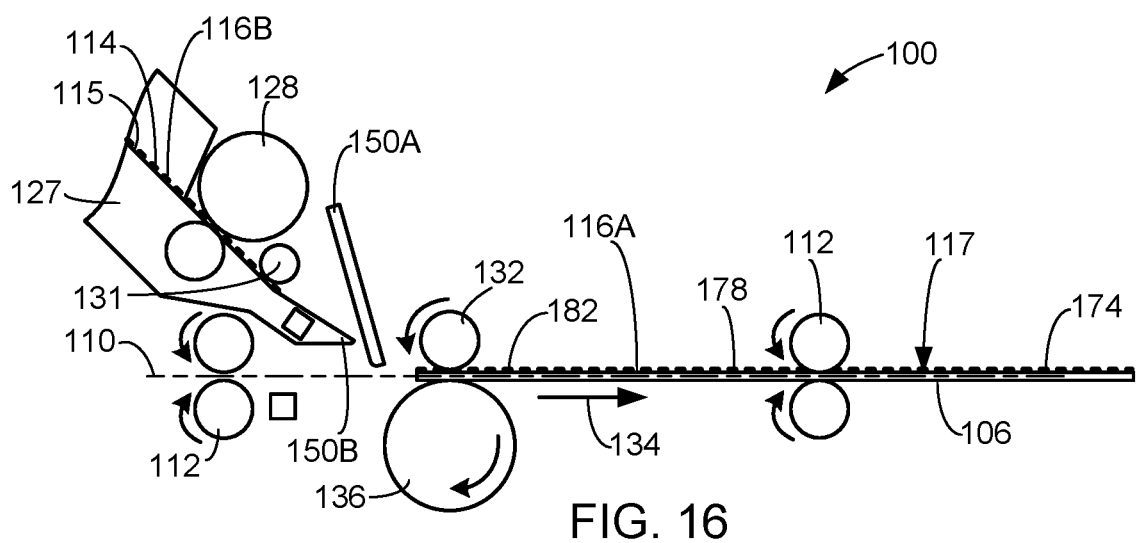

At 188 of the method, the third portion 182 is laminated to the surface 117 of the card substrate 106 using the laminating roller 132, as the card substrate 106 is fed along the card path 110, as shown in FIG. 16. This results in the completion of the lamination operation resulting in a card substrate 106 having a patch laminate 116 laminated to the surface 117. The card substrate 106 with the laminated patch can then be discharged or passed to other components of a credential production device for further processing.

Figure 17:
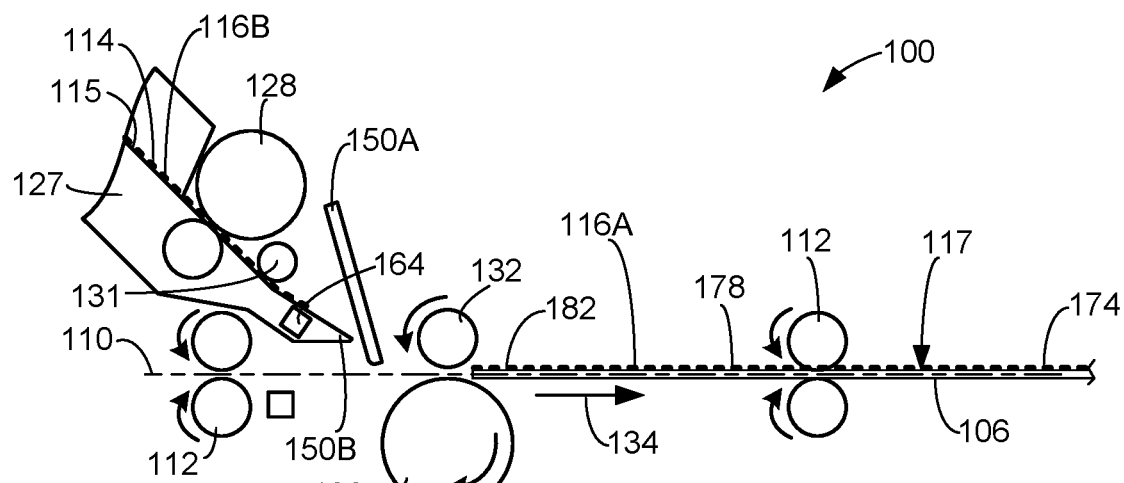
Figure 18:
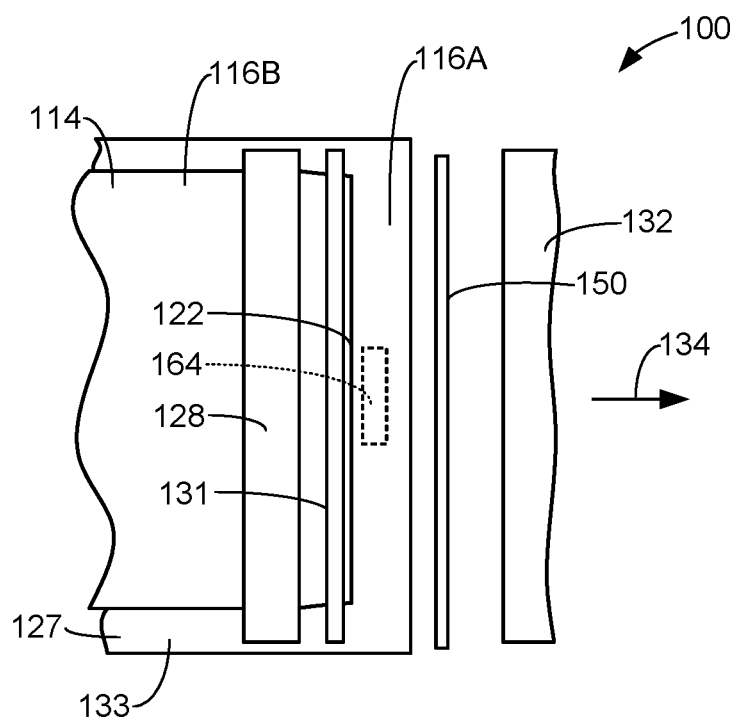
FIGS. 18 and 19 respectively are simplified top and side plan views of a portion of the laminating device of FIG. 1 illustrating feeding and sensing of a leading edge of a patch laminate in accordance with embodiments of the invention.
Figure 19:
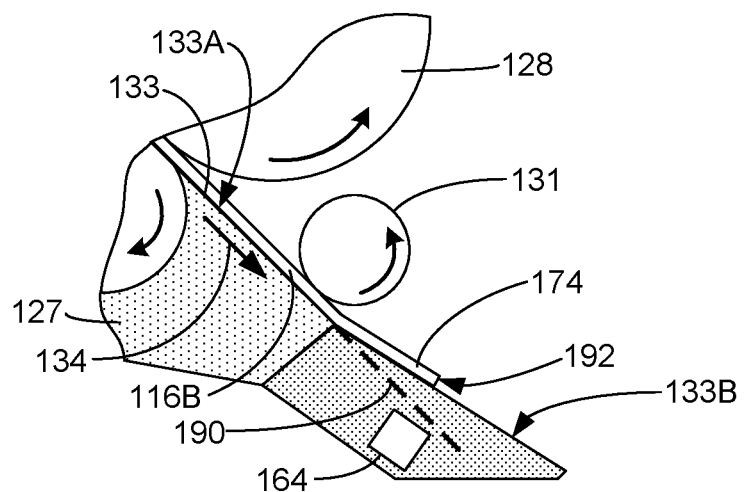

Following the lamination operation, the controller 102 can begin a lamination process using the patch laminate 116B. Initially, the patch 116B is fed in the feed direction 134 along the surface 133 of the path 115 toward the sensor 164, as indicated in FIGS. 17 and 18. As discussed above, the leading portion 174 of the patch laminate 116B is held substantially flat against the surface 133 due to the guide roller 131. In some embodiments, the surface 133 includes a surface portion 133A and a surface portion 133B, which is downstream from the surface portion 133A relative to the feed direction 134, as shown in FIG. 19. In some embodiments, the surface portion 133B causes the leading portion 174 of the patch laminate 116B to deflect away from the plane of the surface portion 133A, which is indicated by dashed line 190 in FIG. 19, as the leading portion 174 is fed in the feed direction 134. This deflection of the leading portion 174 of the patch laminate 116B causes the leading portion 174 to flatten against the surface 133B at the location of the sensor 164. In some embodiments, the surface portion 133B is a substantially flat portion that is oriented at an angle relative to the surface portion 133A, such as 2-5°, for example. In some embodiments, the surface portions 133A and 133B are part of a concave surface that produces the desired deflection of the leading portion 174.

In some embodiments, the sensor 164 detects the leading edge 192 of the patch 116B as it is fed near the sensor 164 (FIG. 19). This detection of the leading edge 192 is used by the controller 102 to align the patch 116B with a substrate 106, as discussed above. In some embodiments, when the sensor 164 is a reflective sensor, the guide roller 131 and/or the spreader 150 include a non-reflective coating to prevent light from reflecting off surfaces of those components that could inhibit the sensor 164 from detecting the leading edge 192 of the patch 116B.

The flattening of the leading portion 174 at the sensor 164 due to the guide roller 131 and/or the deflection of the leading portion 174 by the surface portion 133B increases the accuracy at which the position of the leading patch laminate 116B can be detected. As a result, the device 100 can laminate the patches 116 to substrates 106 within tighter tolerances than conventional lamination devices. Thus, the device 100 is capable of using larger laminate patches 116 than those used by conventional lamination devices, resulting in greater coverage of the substrate 106.

After the controller 102 detects the leading edge or other registration mark of the leading patch laminate 116B, a laminating operation may be performed in accordance with one or more embodiments described above and with reference to the flowchart of FIG. 11 to laminate the patch 116B to a substrate 106. These processes can be repeated with other card substrates 106 and patch laminates 116 as desired.

Although the present invention has been described with reference to preferred embodiments, workers skilled in the art will recognize that changes may be made in form and detail without departing from the spirit and scope of the invention.

What is claimed is:

1. A patch lamination device comprising:
   a laminate feed roller configured to feed a patch laminate ribbon along a laminate path;
   a laminating roller configured to laminate individual patch laminates of the patch laminate ribbon to a surface of a card substrate; and
   a first laminate spreader between the laminate feed roller and the laminating roller, the first laminate spreader configured to reduce the formation of trough wrinkles in a patch laminate caused by tension of the patch laminate generated between the laminate feed roller and the laminating roller, the tension configured to detach the patch laminate from the patch laminate ribbon during a lamination process of the patch laminate in which the patch laminate is detached from the patch laminate ribbon and laminated to a card substrate using the laminating roller;
   wherein the first laminate spreader is configured to contact the patch laminate on both sides of a center line of the patch laminate that is parallel to the laminate path.

2. The device according to claim 1, wherein the first laminate spreader has a length extending across a width of the web of patch laminates that is perpendicular to the laminate path.

3. The device according to claim 2, wherein:
   the first laminate spreader includes at least one patch engaging surface along its length that is perpendicular to the laminate path, the at least one patch engaging surface engaging a patch laminate that is tensioned between the laminate feed roller and the laminating roller during the lamination process of the patch laminate; and the at least one patch engaging surface includes a central patch engaging surface between end patch engaging surfaces, the central patch engaging surface extends closer to a path of the card substrate than the end patch engaging surfaces.

4. The device according to claim 3, wherein the patch engaging surface is concave in a lengthwise direction of the laminate spreader.

5. The device according to claim 2, wherein the first laminate spreader comprises a deflector member having the patch engaging surface.

6. The device according to claim 2, wherein the first laminate spreader comprises a roller having the patch engaging surface.

7. The device according to claim 1, further comprising a second laminate spreader between the laminate feed roller and the first laminate spreader, the second laminate spreader configured to reduce the formation of trough wrinkles in the patch laminate between the laminate feed roller and the laminating roller during the lamination process of the patch laminate.

8. The device according to claim 1, further comprising:
a card transport mechanism configured to transport individual card substrates along a card path; and
a patch sensor configured to detect a perforated line of reduced strength between individual patch laminates in the web.

9. The device according to claim 1, further comprising a laminate feed mechanism including:
the laminate feed roller, which is configured to feed the patch laminate ribbon along the feed path in a feed direction;
a surface that defines a portion of the feed path and includes first and second adjoining portions, wherein the second portion is downstream of the first portion relative to feed direction, and the second portion is oriented at an angle relative the first portion, wherein the second portion deflects and flattens a leading portion of a leading patch laminate of the patch laminate ribbon as the patch laminate ribbon is fed along the feed path in a feed direction by the laminate feed roller; and
a sensor configured to detect a leading edge of the leading patch laminate that is supported on the second portion of the surface.

10. The device according to claim 9, wherein the laminate feed mechanism includes a guide roller located along the feed path between the laminate feed roller and the sensor, the guide roller configured to move away from and toward the second portion of the surface and flatten the leading portion of the leading patch laminate that is supported on the second portion of the surface.

11. A patch lamination device comprising:
a laminate feed roller configured to feed a patch laminate ribbon along a laminate path in a feed direction;
a laminating roller configured to laminate individual patch laminates of the patch laminate ribbon to a surface of a card substrate; and
a first laminate spreader between the laminate feed roller and the laminating roller, the first laminate spreader configured to deflect and reduce trough wrinkles in a patch laminate that are caused by tension of the patch laminate generated between the laminate feed roller and the laminating roller, the tension configured to detach the patch laminate from the patch laminate ribbon during a lamination process of the patch laminate in which the patch laminate is detached from the patch laminate ribbon and laminated to a card substrate using the laminating roller;
wherein the first laminate spreader is configured to remain in contact with the patch laminate for at least substantially a duration of a detachment phase of the lamination process during which the tension is applied to the patch laminate to detach the patch laminate from the patch laminate ribbon.

12. The patch lamination device of claim 11, further comprising:
first and second surface portions configured to support the patch laminate ribbon along the laminate path, wherein the second surface portion is downstream from the first surface portion relative to the feed direction, and the second surface portion is oriented at an angle relative the first surface portion, and wherein the second surface portion deflects a leading portion of a leading patch laminate of the patch laminate ribbon from a plane of the first surface portion as the patch laminate ribbon is fed along the laminate path in the feed direction by the laminate feed roller; and
a sensor configured to detect a leading edge of the leading patch laminate that is supported on the second surface portion.

13. The device of claim 11, wherein the first laminate spreader has a length extending across a width of the web of patch laminates that is perpendicular to the laminate path.

14. The device of claim 13, wherein:
the first laminate spreader includes at least one patch engaging surface that deflects a patch laminate that is tensioned between the laminate feed roller and the laminating roller during the lamination process of the patch laminate; and
the patch engaging surface includes a central patch engaging surface between end patch engaging surfaces, the central patch engaging surface extends closer to a path of the card substrate than the end patch engaging surfaces.

15. The device according to claim 14, wherein the first laminate spreader comprises a deflector member between the second surface portion and the laminating roller, the deflector member including the patch engaging surface.

16. The device according to claim 14, wherein the first laminate spreader comprises a roller having the patch engaging surface.

17. The device according to claim 13, further comprising a second laminate spreader between the laminate feed roller and the first laminate spreader, the second laminate spreader configured to reduce the formation of trough wrinkles in a patch laminate between the laminate feed roller and the laminating roller during the lamination process of the patch laminate.

18. The device according to claim 17, further comprising:
a card transport mechanism configured to transport individual card substrates along a card path; and
a patch sensor configured to detect a perforated line of reduced strength between individual patch laminates in the web.

19. A patch lamination device comprising:
a laminate feed mechanism including a laminate feed roller configured to feed a patch laminate ribbon along a laminate path in a feed direction;
a laminating roller configured to laminate individual patch laminates of the patch laminate ribbon to a surface of a card substrate;

a first laminate spreader between the laminate feed roller and the laminating roller, the first laminate spreader configured to deflect and reduce trough wrinkles in a patch laminate caused by tension of the patch laminate generated between the laminate feed roller and the laminating roller, the tension configured to detach the patch laminate from the patch laminate ribbon during a lamination process of the patch laminate in which the patch laminate is detached from the patch laminate ribbon and laminated to a card substrate using the laminating roller; and a card transport mechanism configured to transport individual card substrates along a card path;

wherein the first laminate spreader comprises at least one patch engaging surface including a central patch engaging surface between end patch engaging surfaces, wherein the central patch engaging surface extends closer to the card path than the end patch engaging surfaces; and wherein the first laminate spreader is configured and positioned such that when the patch laminate is tensioned during the lamination process, the patch laminate is pressed against the first laminate spreader to substantially conform to the at least one patch engaging surface.

20. The device of claim 19, wherein:

the first laminate spreader comprises a length extending across a width of the web of patch laminates that is perpendicular to the laminate path.

21. The device of claim 1, wherein the first laminate spreader is configured to contact the patch laminate across substantially an entire width of the patch laminate.

* * * * *